(12) United States Patent
Schlenkert et al.

(10) Patent No.: US 6,815,701 B2
(45) Date of Patent: Nov. 9, 2004

(54) METHOD AND DEVICE FOR MEASURING WEAR ON INTERNAL BARREL SURFACES

(75) Inventors: Gert Schlenkert, Düsseldorf (DE); Horst Reckeweg, Heiligenhaus (DE); Göran Vogt, Burgwedel (DE)

(73) Assignee: Rheinmetall W&M GmbH, Unterluss (DE)

( * ) Notice: Subject to any disclaimer, the term of this patent is extended or adjusted under 35 U.S.C. 154(b) by 55 days.

(21) Appl. No.: 10/379,823

(22) Filed: Mar. 6, 2003

(65) Prior Publication Data

US 2003/0201409 A1 Oct. 30, 2003

(30) Foreign Application Priority Data

Mar. 6, 2002 (DE) .......................................... 102 09 953

(51) Int. Cl.[7] .............................................. G01N 21/88
(52) U.S. Cl. ............................. 250/559.07; 250/559.24; 356/241.1
(58) Field of Search ........................ 250/559.05–559.07, 250/559.22–559.24, 559.42–559.45, 223 B, 236; 356/241.1, 241.6, 601, 602, 608; 33/520, 529, 286

(56) References Cited

U.S. PATENT DOCUMENTS 4,967,092 A * 10/1990 Fraignier et al. ...... 250/559.07
5,576,826 A * 11/1996 Hammar ..................... 356/138

* cited by examiner

Primary Examiner—Kevin Pyo
(74) Attorney, Agent, or Firm—Venable LLP; Stuart I. Smith

(57) ABSTRACT

A method and a device for measuring wear on the internal surfaces (12) of barrels (1), in particular weapon barrels. For a very precise determination of the wear on the internal surfaces (12) of barrels (1), a non-contacting scanning of the internal surface (12) of the respective barrel (1) to be checked is carried out with a light-spot triangulation sensor (6), to determine the respective distance between the internal surface (12) and the barrel axis (7) for selected sensor positions. The contour of the internal surface (12) of the respective barrel (1) is then determined from the detected distance changes. It has proven advantageous if the measured distance values are displayed on a monitor (23) in the form of a C-image, wherein different distance ranges are characterized with different colors, so that faulty surface areas can immediately be recognized optically.

8 Claims, 2 Drawing Sheets

METHOD AND DEVICE FOR MEASURING WEAR ON INTERNAL BARREL SURFACES

CROSS REFERENCE TO THE RELATED APPLICATION

This application claims the priority of German Patent Application DE 102 00 953.7 filed Mar. 6, 2002 which is incorporated herein by reference.

BACKGROUND OF THE INVENTION

The invention relates to a method for measuring wear on internal barrel surfaces, particularly of weapon barrels, as well as to a device for realizing this method.

As a result of hot propellant charge gases and/or friction between the projectile and the internal surface of the respective weapon barrel, the latter is subjected to erosive and/or abrasive wear that affects the service life of the respective weapon barrel. The weapon barrels must therefore be checked from time to time for wear. According to a previously proposed solution, the surface of the barrel to be checked must be scanned mechanically to measure the wear. However, this method has the disadvantage of being extremely time-consuming and relatively imprecise.

SUMMARY OF THE INVENTION

It is the object of the invention to provide a method for determining with extreme accuracy the wear on the internal surfaces of barrels and, in addition, provide a device for realizing this method.

This object is achieved according to a first aspect of the invention by a method that is essentially based on the non-contacting scanning of the internal surface of the respective barrel to be checked with the aid of a light-spot triangulation sensor and determining of the respective distance between the internal surface and the barrel axis for selected sensor positions. The contour of the internal surface of the respective barrel can subsequently be inferred from the detected distance changes. In the process, it has proven advantageous if the measured distance values are displayed on a monitor in the form of a C-image, wherein different radial distance ranges can be characterized with different colors so that the faulty surface regions can immediately be detected optically.

The above object generally is achieved according to a second aspect of the invention by a device for measuring the internal surface wear that comprises a manipulator that can be inserted into the respective barrel and contains a light-spot triangulation sensor, as well as a control unit required for actuating the manipulator and a signal evaluation device that is connected to the sensor. The manipulator is provided with a housing that can rotate around the barrel axis and contains an axial guide that is connected so as to rotate along with the housing. The triangulation sensor is arranged so as to be displaceable in longitudinal direction along this guide. In addition, the rotating housing has a gap-type opening that extends in the direction of the barrel axis. The light emitted by the light source of the triangulation sensor can travel through this opening to the outside and the light reflected by the internal barrel surface can travel back through the opening to the detector of the sensor. The rotating housing supports itself at both ends in pivoting brackets or bearings that can be secured, with radially displaceable holding elements, on the internal barrel walls and permit an automatic centering or the manipulator inside the barrel.

Supporting the manipulator on both sides inside the barrel ensures that the triangulation sensor can be moved relatively precisely along the barrel axis during the axial displacement. In addition, it results in a quiet running of the housing during the rotation around the barrel axis. Finally, the rotating housing protects the triangulation sensor against mechanical damage.

A laser diode is preferably used as a light source for the light-spot triangulation sensor because it has better radiation characteristics as compared co other light sources, e.g. light-emitting diodes (which can also be used) and permits a more compact design. Owing to their high sensitivity, CCD line sensors (CCD-charge coupled device) in particular have proven useful an detectors for triangulation sensors.

Further details and advantages of the invention become evident from the following exemplary embodiment explained with the aid of the figures.

DETAILED DESCRIPTION OF THE INVENTION

Figure 1:
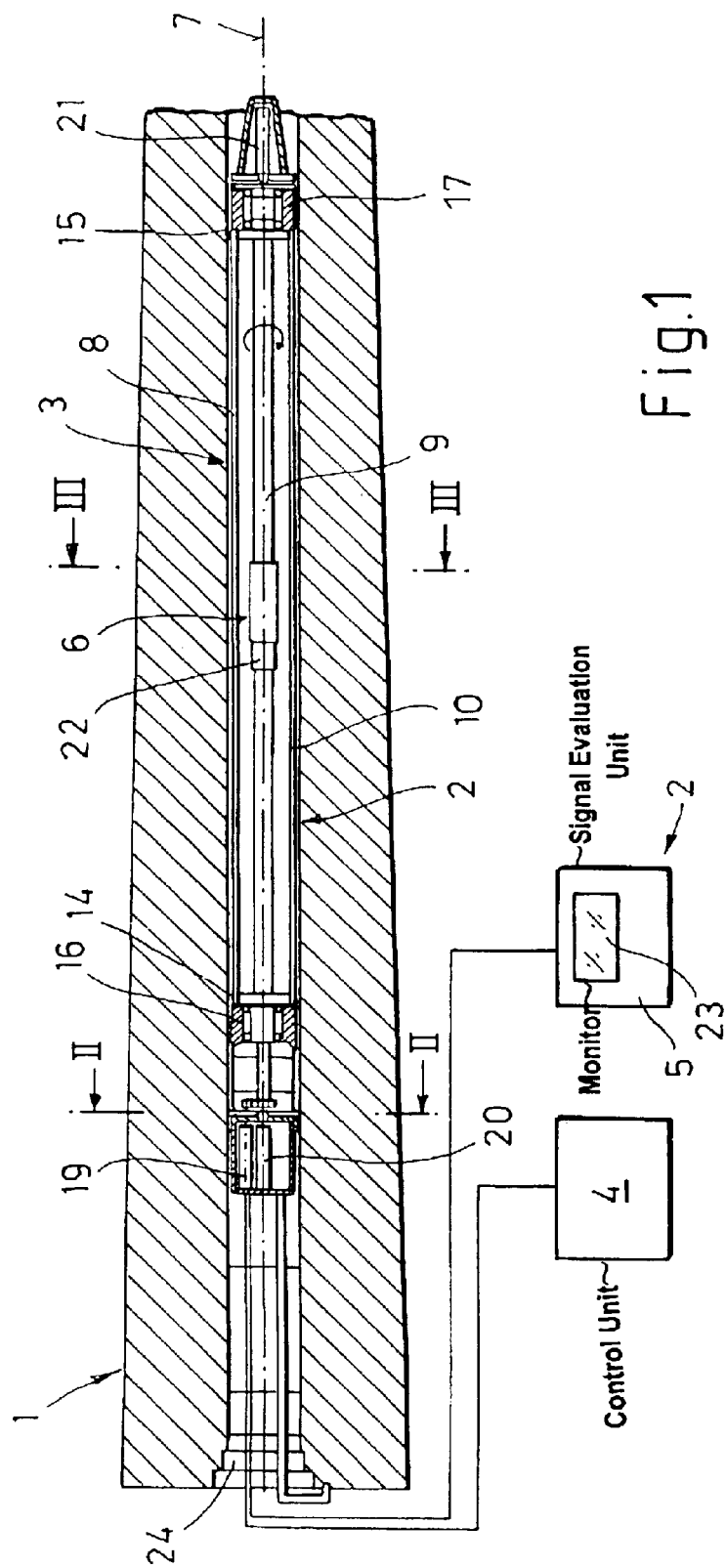
FIG. 1 is a longitudinal section through a weapon barrel and a device according to the invention, comprising a manipulator, with a light-spot triangulation sensor, arranged inside the weapon barrel.

In FIG. 1, the numeral 1 refers to the weapon barrel and the numeral 2 refers to the device 2 according to the invention, the device 2 according to the invention comprises a manipulator 3 that is positioned inside the weapon barrel 1, an external control unit 4 for actuating the manipulator 3, as well as a signal evaluation device 5 that is connected to a light-spot triangulation sensor 6 inside the manipulator 3.

The manipulator 3 comprises a housing 8 that can rotate around the barrel axis 7 and contains an axial guide 9, which is fixedly connected to the housing a for rotation therewith. The triangulation sensor 6 is mounted on the guide 9 and is arranged such that it can be displaced in longitudinal direction along this guide 9. The rotating housing 8 contains a gap-like opening 10 that extends in the direction of the barrel axis 7. The light emitted by the light source 11 of the light-spot triangulation sensor 6 travels through this opening 10 to the outside and the light reflected by the internal surface 12 of the barrel 1 returns through the opening 10 to the detector 13 of the triangulation sensor 6.

Figure 2:
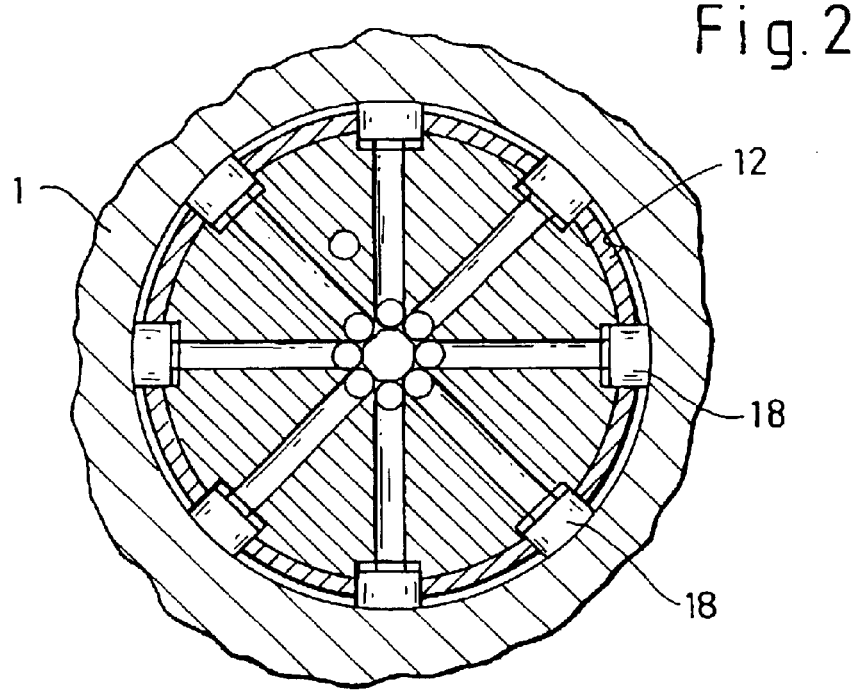
FIG. 2 is an enlarged representation of a cross section through the weapon barrel with a manipulator shown in FIG. 1 along the sectional lines II—II.
Figure 3:
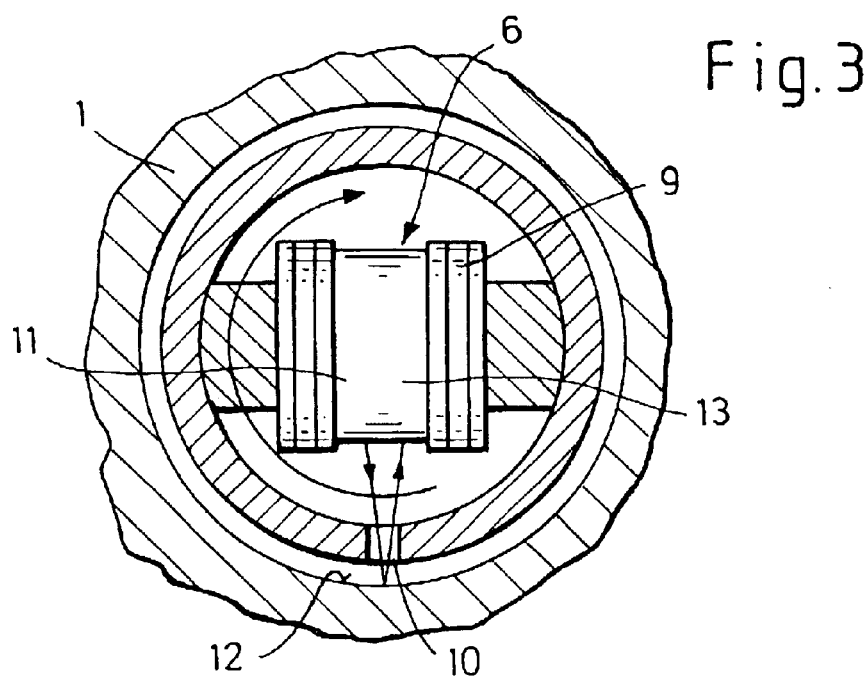
FIG. 3 is an enlarged representation of a cross section through the weapon barrel with a manipulator shown in FIG. 1 along the sectional lines III—III.

The rotating housing 8 is supported at both ends 14, 15 inside pivoting brackets or bearings 16, 17, which can be secured, with the aid of a plurality of radially displaceable holding elements 18 (FIG. 2), to the internal surface 12 of the weapon barrel 1. The manipulator 3 additionally is provided with several electric drives 19–22 for the radial displacement of the holding elements 18 as well as the axial displacement of the light-spot triangulation sensor 6 along the guide 9 and for rotating the housing 8.

The light-spot triangulation sensor 6 for the exemplary embodiment shown uses a sensor with a laser diode as a light source 11 and a CCD-line sensor as a detector 13 (for the design and operation of light-spot triangulation sensors of this type, see also "SENSORTECHNIK" HANDBUCH FUER PRAXIS UND WISSENSCRAFT" [*Sensor Technology: A Manual for Science and Practical Operations*], published by Tränkler, Hans-Rolf and Obermeier, Ernst. Springer Publishing House 1998, pp.571–580).

The following contains further details regarding the measuring of wear on the surface 12 of the weapon barrel 1 with the aid of the device 2 according to the invention.

The manipulator 3 is initially inserted from the loading chamber 24 into the weapon barrel 1 and is oriented with respect to a predetermined zero or reference point along the length of the weapon barrel. At the same tine, the manipulator 3 is centered relative to the barrel axis 7 with the aid of the holding elements 18, such that the triangulation sensor 6 is always at the same distance to the surface 12 of the barrel 1 in the undamaged reference region. Following the securing of the manipulator 3 inside the weapon barrel 1, the triangulation sensor 6 is moved, with the aid of the electric drive 22, from an original position (home position) along the guide 9 to an optional starting point inside the measuring range of the device. The distance traveled from the home position to the starting point can be seen on a monitor 23 for the signal evaluation device 5. Alternatively, it is also possible to enter a distance value directly, whereupon the manipulator 3 automatically moves the sensor 6 along the guide 9 to this location.

Following the input of the respective data, the manipulator 3 starts up and provides a fully automatic guidance for the scanning operation. In the process, the housing 8 with the triangulation sensor 6 rotates around the barrel axis 7 while the sensor 6 is simultaneously displaced along the guide 9 and along the barrel axis 7, thus resulting in a spindle-type advance of the triangulation sensor 6. At specific time intervals, the triangulation sensor 6 measures the distance to the surface 12 of weapon barrel 1. For this purpose a laser beam is emitted by the light source 11 according to a predetermined clocking rate (e.g., 4 kHz), which beam hits the barrel surface 12 to be checked and is reflected or scattered back by this surface. The detector 13 of the triangulation sensor 6 subsequently receives the reflected or scattered back portion of the radiation. The sensor 6 records all distance changes relative to a basic distance value (standoff), which essentially corresponds to the distance between the laser exit point of the sensor 6 and the center of the measuring range. Voltage changes that have a correlation to the distance changes are evaluated. The voltage differences are then digitized and further processed in a microcomputer of the signal evaluation device 5. In particular, different distance and thus also voltage values can be assigned by the signal evaluation device 5 to different colors, which are then displayed on the monitor 23 of the signal evaluation device 5. The displayed color course represents the geometric condition of the surface 12 of the weapon barrel 1.

The position changes of the laser spot on the barrel surface 12, starting with the measuring point, are recorded with distance sensors (not shown) that can be arranged, for example, on the rotating housing 6 and on the triangulation sensor 6. The position of the faulty locations can thus be determined precisely and their area of expansion can be computed.

The manipulator 3 is stopped following the completion of the scanning operation. Following storage of the measuring data, the operator can either move the triangulation sensor 6 automatically back to the starting position or can perform another scanning operation, starting from the end position of the first scanning operation.

If the manipulator 3 is to be removed from the barrel 1, the triangulation sensor 6 must first be moved back to its home position.

The device 2 according to the invention must be calibrated from time to time with the aid of a ring that has a known inside diameter and that does not show wear on its internal surface. The values, measured and processed during this operation, are then compared to the known ring diameter and the device is adjusted, if necessary. This operation is done automatically, meaning the manipulator 3 automatically advances to the calibration region, measures the diameter values, compares these values to the predetermined values and subsequently adjusts the device. The correction values are displayed on the monitor 23. A message urging the testing of the complete device is displayed if specific tolerance values are exceeded. The calibration element is preferably integrated into the device.

To display and evaluate the measuring data relative to the actual axis of the weapon barrel, a manipulator would have to be used that rotates the sensor during each point in time of the scanning operation precisely around the axis. The position of the manipulator and thus also the triangulation sensor inside the barrel can be decentralized as a result of wear in the clamping region for the mechanical devices, a possible curvature in the barrel in axial direction, or the displacement of the loading chamber relative to the barrel region with fields and tensile forces. In order to compensate these mechanical influences, the measuring values recorded by the sensor must be corrected prior to the evaluation to avoid a distortion of the measuring results. The correction values (displacement between the axis, along which she sensor moves, and the barrel axis) can be derived from the measured distance values, wherein at least two measuring values are required that have been recorded at different angular positions.

The invention now being fully described, it will be apparent to one of ordinary skill in the art that many changes and modifications can be made thereto without departing from the spirit or scope of the invention as set forth herein.

What is claimed is:

1. A method for measuring the wear on an internal surface of a barrel, comprising the steps of:

inserting a light spot triangulation sensor into a barrel to be tested;

displacing the sensor along a longitudinal axis of the barrel while rotating the sensor around the barrel axis to scan the internal barrel surface to be tested;

at selected sensor positions during the displacement, measuring the respective distance between an internal barrel surface and the sensor to determine a distance between the barrel surface and the barrel axis; and, forming an image of the barrel surface from these distance values.

2. The method according to claim 1 further including forming a C-image of the barrel surface and displaying the C-image on a monitor.

3. The method according to claim 1, further including displaying different distance values with different colors on the monitor.

4. The method according to claim 1 wherein the barrel to be tested is a weapon barrel.

5. A device for measuring wear on an internal surface of a barrel, in particular a weapon barrel, with said device comprising a manipulator that can be inserted into the respective barrel, a control unit required for actuating the manipulator, and a signal evaluation device that is connected to the sensor: and wherein said manipulator includes a housing mounted for rotation around and along a longitudinal axis substantially corresponding to a barrel axis when installed in a barrel, an axial guide disposed in the housing along said longitudinal axis and fixedly connected to the housing for rotation therewith, and a light-spot triangulation sensor mounted on the axial guide for displacement in the longitudinal direction;

a gap-type opening, which extends in the direction of the barrel axis, is provided in the housing and through which light emitted by a light source of the light-spot triangulation sensor can reach the outside and light reflected or scattered back by an inside surface of the barrel can reach a detector of the sensor, and a respective pivoting bracket is disposed at each end of the housing and in which the housing is mounted for rotation and with each of said brackets being provided with a plurality of radially displaceable holding elements for adjustably securing the housing to the inside surface of a barrel.

6. The device according to claim 5, wherein the manipulator further includes electrical drives, which are selectively actuated by the control unit, for the axial displacement of the light-spot triangulation sensor along the guide and for rotating the rotatable housing.

7. The device according to claim 5, wherein the detector for the light-spot triangulation sensor is a CCD-line sensor.

8. The device according to claim 5, wherein the light source of the light-spot triangulation sensor is a laser diode.

* * * * *